United States Patent Office 3,494,640
Patented Feb. 10, 1970

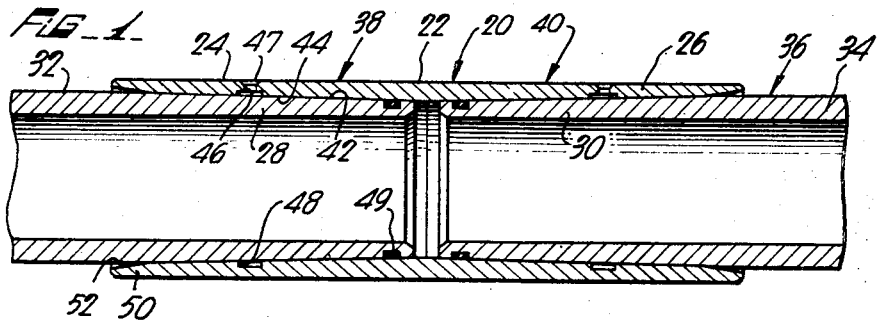
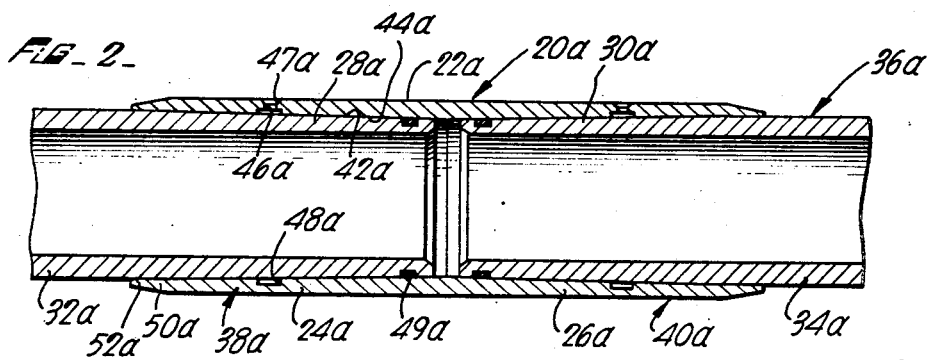
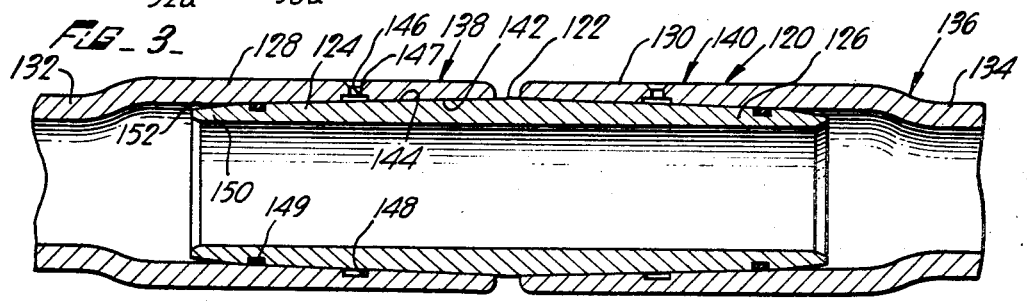
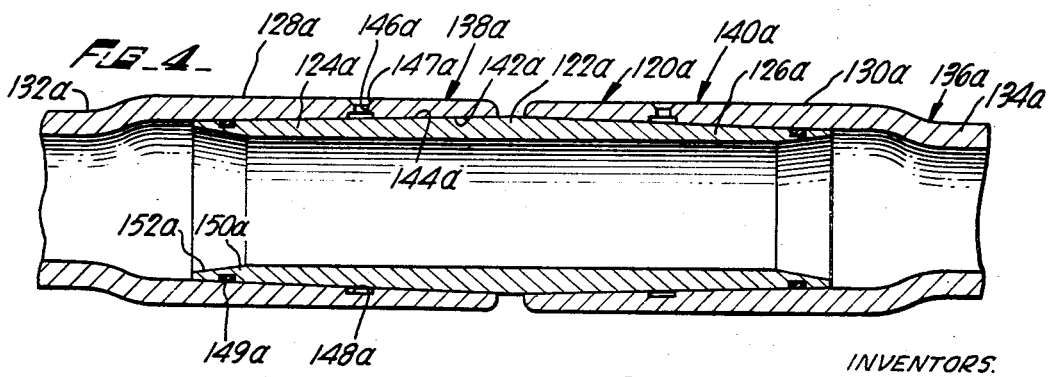
INVENTORS:
CLARENCE J. COBERLY,
FRANCIS BARTON BROWN,
BY THEIR ATTORNEYS,
HARRIS, KIECH, RUSSELL & KERN Feb. 10, 1970   C. J. COBERLY ET AL   3,494,640
FRICTION-TYPE JOINT WITH STRESS CONCENTRATION RELIEF
Original Filed Dec. 3, 1965   2 Sheets-Sheet 2
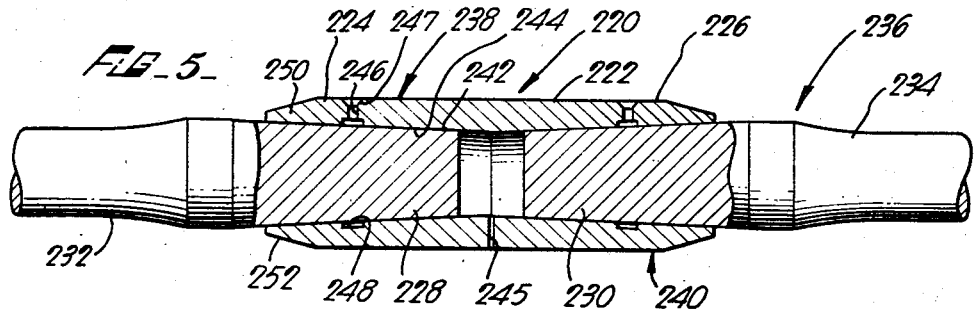
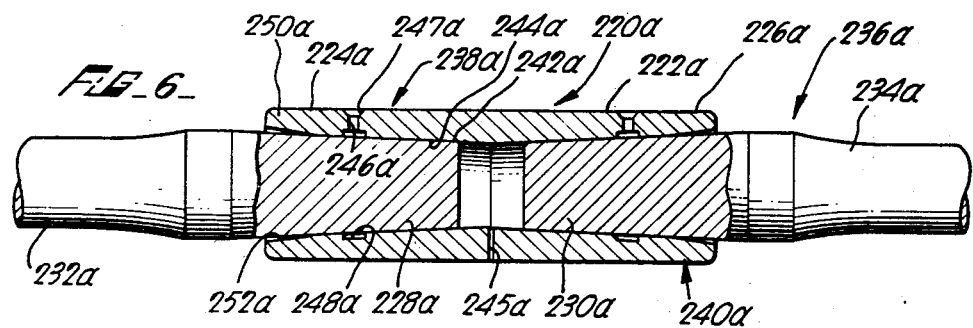
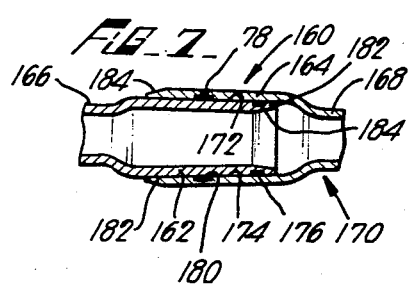
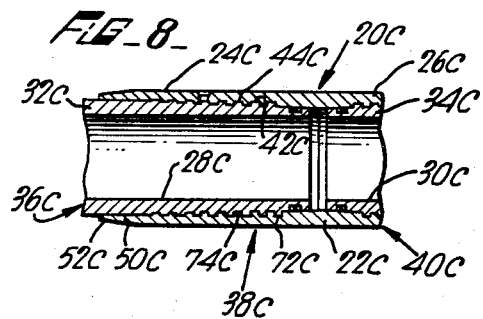
INVENTORS.
CLARENCE J. COBERLY,
FRANCIS BARTON BROWN,
BY THEIR ATTORNEYS,
HARRIS, KIECH, RUSSELL & KERN.

3,494,640
FRICTION-TYPE JOINT WITH STRESS CONCENTRATION RELIEF
Clarence J. Coberly, San Marino, and Francis Barton Brown, La Crescenta, Calif., assignors to Kobe, Inc., Huntington Park, Calif., a corporation of California
Continuation of application Ser. No. 511,424, Dec. 3, 1965. This application Oct. 13, 1967, Ser. No. 675,250
The portion of the term of the patent subsequent to Dec. 17, 1980, has been disclaimed
Int. Cl. F16l 35/00, 55/00
U.S. Cl. 285—115        6 Claims

ABSTRACT OF THE DISCLOSURE

A shrink fit rod or tubing joint including a coupling having ends formed to relieve stress concentrations in the rods or tubings joined thereby.

---

This application is a continuation of our co-pending application Ser. No. 511,424, filed Dec. 3, 1965, and now abandoned. Ser. No. 511,424 is a continuation-in-part of our co-pending application Ser. No. 325,707, filed Nov. 22, 1963, now Patent No. 3,451,119, which, in turn, is a continuation-in-part of our Patent No. 3,114,566, granted Dec. 17, 1963.

The invention constituting the subject matter of this application relates in general to a high-strength, friction-type joint for interconnecting such elongated elements as tubings or rods, usually in end-to-end, aligned relation, to form tubing or rod strings capable of withstanding high axial and/or torsion loads, and/or, in the case of tubing strings, high internal pressures. More particularly, the invention relates to, and a primary object thereof is to provide, means for minimizing stress concentrations at one or both ends of the interface between two frictionally engaged surfaces, constituting each high-strength, friction-type joint of the invention.

As general background, tubing or rod strings incorporating the high-strength, friction-type joint of the invention may include any number of elongated elements oriented in any direction. One important use of such a rod or tubing string is in a well with the string oriented vertically and subjected to high axial tension loads due to its weight. Additionally, such high axial tension loads may be due in part to a high internal pressure in the case of a tubing string, or a high pumping load in the case of a rod string. Alternatively, or additionally, the string may be subjected to high torsion loads, as in the case of a drill string.

The term "tubing" is used herein to include tubes or pipes of any lengths and wall thicknesses. Tubings may be classed as thin walled or thick walled relative to their outer diameters. Such classes of tubings differ in that, in a thin-walled tubing, any hoop stresses developed therein are substantially uniform throughout the thickness of the wall, whereas, in a thick-walled tubing, there is a distinct hoop stress gradient throughout the thickness of the wall. Tubings commonly used in oil wells may be regarded as falling into the thin-walled class, examples being tubings or pipes used in producing oil, drill pipe, casing, liners, and the like.

The term "rod" is used herein to cover solid, i.e., non-tubular, elongated elements. Rod strings are widely used in the oil industry for transmitting power from the surface to bottom hole pumps in oil wells, the rods commonly being referred to as "sucker rods."

Friction-type joints with which the method and apparatus of the invention may be used rely for axial and torsional strength predominantly or exclusively on frictional resistance to relative bodily displacement of axially tapered surfaces of an inner member and an outer, tubular member fitted over the inner member, the tapered surfaces being frictionally interengaged, usually in direct physical contact, with a high engagement or contract pressure therebetween along an interface which is substantially continuous and tapers substantially uniformly throughout the axial length of frictional interengagement between said tapered surfaces, and which has a small included angle. Both such members may be adjacent ends or end portions of adjoining elongated elements, or one may be an end or end portion of an elongated element and the other an end or end portion of a coupling. Normally, the coupling will have oppositely tapered end portions for pressural interengagement with complementarily tapered surfaces of adjacent ends of two elongated elements to be interconnected by the coupling. In most instances, the coupling is tubular and may be either internal or external with respect to the tubing or rod ends to be interconnected thereby.

It is important that the strength of such a friction-type joint against relative bodily displacement of its tapered surfaces should be at least nearly equal to the yield strength of the elongated elements it interconnects. While stresses in rod or tubing strings used in oil wells are within the elastic limit of the rods or tubings during normal use, it is important that none of the joints fail if higher stresses are transiently developed under unusual conditions. Under such circumstances, it is important that axial tension loads, for example, up to the yield strength, or even the ultimate strength, of the rods or tubings be applicable to the rod or tubing strings without failure of the joints thereof.

All conventional rod or tubing joints now in use are of the threaded variety and costly upsetting and heat treatment is required if the joint strength is to equal or exceed the tensile strength of the rod or tubing. In addition, threaded joints are necessarily bulky and occupy valuable space in the well. For example, it is often necessary to run two or more tubing strings side by side in a well casing and the size of conventional threaded joints limits the number of tubing strings that can be placed in the casing, or requires an increase in the size of the casing. It is a feature of the present friction-type joint that rods or tubings can be adequately connected in a rod or tubing string thereby in much less space than threaded joints. As compared with conventional practice, it is usually possible to employ well casings two full sizes smaller to contain an array of two or more parallel tubing strings, resulting in substantial savings in drilling and casing costs. Conversely, it becomes possible to use more or larger tubing strings in any existing casing or well. Generally similar considerations are applicable to rod strings using such a friction-type joint.

The strength of the present friction-type joint depends primarily on three factors, viz., the actual length of the interface throughout which the tapered surfaces are in pressural engagement, the effective coefficient of friction between the tapered surfaces, and the engagement pressure therebetween. The taper angles should be relatively small, but can vary throughout a relatively wide range as hereinafter discussed. It is desirable to provide the joint with a relatively high effective coefficient of friction and a very high engagement pressure between the tapered surfaces so that the length of the tapered surfaces in pressural interengagement can be relatively small. The foregoing factors can be so related as to produce a joint strength that is at least substantially equal to the yield strength of the rods or tubings interconnected by the joint. Ideally, the joint strength is equal to or exceeds the ultimate strength of the rods or tubings so that failure will occur in one of the rods or tubings, and not in the joint. It is surprising that a friction-type joint of such axial strength can be produced, but many tests have shown these results to be possible.

The desired high engagement pressure between the tapered surfaces of the inner and outer members of the friction-type joint is the result of a high hoop tension stress in the outer member and an opposing high compression stress in the inner member. To achieve maximum joint strength, these stresses approximate, but are slightly below, the yield strengths of the materials of the two members.

The high hoop tension stress in the outer member establishes therein an initial axial compression stress which, according to Poisson's ratio for steel, is approximately equal to 0.3 times the hoop tension stress. Such an initial axial compression tends to reduce the axial length of the outer member and tends to increase its taper angle to a related extent. Likewise, the opposing high compression stress in the inner member establishes therein an initial axial tension equal to about 0.3 times the stress in question. This similarly tends to lengthen the inner member and tends to decrease its taper angle. However, it has been found that the actual taper-angle changes are insignificant and do not affect the joint strength significantly.

Still another factor is that in applying an axial make up force to the members in making up the joint, the inner member may be subjected to an axial compressive stress tending to increase its diameter. Upon relaxation of the make up force, the diameter of the inner member tends to decrease to its original value, which would appear to tend to weaken the joint by reducing the engagement pressure. However, this effect has been found to be insignificant.

An external axial load applied to one of the members of the joint is transferred progressively to the other along the length of the interface throughout which the two tapered surfaces are pressurally interengaged. An axial tensile stress due to an axial tension load is additive with respect to the initial axial tension stress in the inner member. Likewise, the axial tension stress due to such an axial load reduces the initial axial compression stress in the outer member to the point of changing it to a net axial tension stress along most of the length of the interface.

The engagement pressure between the tapered surfaces induced by the hoop tension and compression stresses in the outer and inner members changes upon application of such an axial load to one of the members. If it is assumed that initially the engagement pressure or interference fit between the surfaces was uniform along the interface, application of such an axial load will increase the contact pressure or interference fit near one end of the interface and decrease same near the other end thereof, only an intermediate portion of the interface being free of such effects. Likewise, application of such an axial load has been found to cause relative axial movement between the engaged tapered surfaces at positions near the ends of the interface.

It thus becomes apparent that any analysis of the stress in the joint under initial and loaded conditions becomes extremely complex. Many of the factors noted above as concerns initial stress and change in stress upon axial loading might seem to indicate that no friction-type joint could be designed that would not pull apart at loads equal to the nominal yield strength or the nominal ultimate strength of the rods or tubings. Tests have shown, however, that a friction-type joint can be provided meeting these conditions without failure. It has been found that the change in axial stress in the members due to axial loading, change in engagement pressure or interference fit between the tapered surfaces upon such loading, and the relative movement between such surfaces upon such loading, are not such as to preclude a friction-type joint having a strength greater than the yield or even the ultimate strength of the rods or tubings.

The friction-type joint is preferably so constructed that the outer tubular member will grip the inner member tighter upon the application of an axial tension load. The material and dimensions of the inner and outer members may be so selected and related that at least a portion of the outer member contracts relative to the inner member upon application of an axial tension load to thereby increase the engagement pressure between the tapered surfaces adjacent such portion. This effect may be enhanced very considerably by utilizing for the inner member a material having an appreciably higher modulus of elasticity than the material of the outer member.

The tapered surfaces of the inner and outer members may be in direct physical contact along the interface and may be roughened to increase the effective coefficient of friction therebetween. Alternatively, the tapered surfaces may be in pressural interengagement without direct physical contact, but with a keying agent disposed between and embedded in the tapered surfaces along the interface to increase the effective coefficient of friction therebetween, particularly where the joint must resist relative bodily displacement of the tapered surfaces under torsional stress.

Preferably, in instances where adjacent rod or tubing ends are interconnected by couplings, the rod or tubing ends are cold worked to provide same with higher unit yield strengths than the nominal yield strengths of the bodies of the rods or tubings, thereby increasing the overall strengths of the joints.

In most of the friction-type joints hereinafter considered, the tapered surfaces are unthreaded and the joints are made up by relative axial displacement of the inner and outer members without relative rotation thereof. In some instances, however, the tapered surfaces may be provided with shallow, wide, tapered threads having flat crest and root surfaces which form the pressurally interengaged tapered surfaces serving to frictionally prevent relative bodily displacement of the inner and outer members. In this instance, the threads merely serve to relatively axially displace the inner and outer members in response to rotation thereof, the inner and outer members being held together primarily by friction resulting from pressural interengagement of the root and crest surfaces, and only incidentally by any mechanical interlock between the threads.

The invention further contemplates achieving the desired high hoop tension and compression stresses in the outer and inner members by shinking the outer member on the inner, and, more particularly, by shrinking the outer member on the inner hydraulically. This permits the joint to be made up easily, and also permits the joint to be broken readily. Also, the joint may be made up and broken repeatedly in this manner.

More specifically, the invention contemplates hydraulically shrinking the outer member on the inner in such a manner that the materials of the outer and inner members are stressed substantially to, but not quite to, their yield points to achieve the maximum possible engagement pressure between the tapered surfaces of the members, whereby to achieve maximum joint strength. Preferably, a fluid, such as oil, is injected into an axially central region of the interface between the tapered surfaces of the inner and outer members under sufficient pressure to stress the materials of these members substantially to, but not quite to, their respective yield points in the central region, which results in radial separation of the tapered surfaces in such region. The injected fluid is prevented from escaping from the central region by sealing engagement of the tapered surfaces in annular sealing regions at opposite ends of the central region.

In making up the tapered joint in accordance with the foregoing, the inner and outer members are relatively moved axially into successively further inserted positions of the inner member as the pressure of the fluid injected into the central region of the interface builds up, simultaneously relatively rotating the members if the tapered surfaces are threaded, thereby maintaining the tapered surfaces in sealing engagement in the sealing regions at the ends of the central region. When the injection pressure and the axial make up force reach their maximum values, the joint is fully made up and the pressure of the injected fluid in the central region is reduced substantially to atmospheric to permit outward expansion of the contracted portion of the inner member and inward contraction of the expanded portion of the outer member, thereby producing the desired high engagement pressure between the tapered surfaces of the two members with hoop tension and compression stresses in the outer and inner members substantially, but not quite, equal to the yield points of the materials of these members.

In breaking the joint, the foregoing procedure is essentially reversed, the pressure of the injected fluid in the central region serving to separate the tapered surfaces of the inner and outer members in this region so that the inner and outer members may be axially separated. Such axial separation is produced entirely by, or at least aided by, the action of the pressure of the injected fluid on the projected areas of the tapered surfaces.

Only relatively light engagement pressures are necessary in the sealing regions to prevent the escape of the injected fluid from the central region in making up and breaking the joint, so that, with the foregoing procedure, the joint can be made up easily, and broken readily, without galling the tapered surfaces, irrespective of whether they are unthreaded or threaded. Consequently, the joint can be made up and broken repeatedly in accordance with the invention without impairing the effectiveness of the tapered surfaces, which is an important feature.

With the foregoing as background, an important object of the invention is to provide a high-strength, friction-type joint of the character outlined which includes means for minimizing any stress concentration tending to exist in at least the rod or tubing end of the joint adjacent the corresponding end of the interface between the tapered surfaces of the inner and outer members, such a stress concentration tending to exist if the full engagement pressure is maintained all the way to the corresponding end of the interface. The joint may be provided with means for minimizing stress concentrations at both ends of the interface, but, in the event that one of the members of the joint is a coupling, it is usually not necessary to minimize any stress concentration tending to exist in the coupling at the corresponding end of the interface since the coupling, being a relatively small component, can economically be made of a material capable of withstanding any stress concentration developed therein.

More particularly, an important object of the invention is to progressively reduce the engagement pressure between the tapered surfaces in the end region of the interface which is adjacent the body portion of the corresponding tubing or rod, and in a direction which extends axially toward the corresponding end of the interface, so as to minimize any stress concentration tending to exist in the body portion of the tubing or rod adjacent such corresponding end of the interface.

Another object of the invention is to minimize any stress concentration tending to exist in a tubing or rod adjacenn an end of a coupling constituting part of the friction-type joint of the invention by providing the coupling with a progressively-relieved end region having the effect of progressively reducing the engagement pressure between the two tapered surfaces in a direction which extends axially toward the corresponding end of the coupling.

Still another object is to provide a friction-type joint of the foregoing nature wherein the progressively-relieved end region of the coupling comprises an axial extension of the tapered surface of the coupling having a taper angle differing slightly from that of the complementary tapered surface of the tubing or rod end. With this construction, the desired progressive decrease in the engagement pressure between the tapered surfaces of the coupling end and the tubing or rod end is achieved, thereby minimizing any stress concentration in the tubing or rod adjacent the end of the coupling.

A further object is to provide a friction-type joint wherein the progressively-relieved end region of the coupling progressively decreases in thickness in a direction extending axially toward the corresponding end of the interface. With this construction, the hoop tension progressively decreases throughout the end region of the coupling so as to progressively decrease the contact pressure in such region, thereby progressively increasing the stress in the tubing or rod throughout the end region of the coupling so as to minimize any stress concentration.

The foregoing objects, advantages, features and results of the present invention, together with various other objects, advantages, features and results thereof which will be evident to those skilled in the art to which the invention relates in the light of this disclosure, may be achieved with the exemplary embodiments of the invention described in detail hereinafter and illustrated in the accompanying drawings, in which:

FIGS. 1 and 2 are longitudinal sectional views respectively illustrating high-strength, friction-type, external-coupling tubing joints of the invention;

FIGS. 3 and 4 are longitudinal sectional views respectively illustrating high-strength, friction-type, internal-coupling tubing joints of the invention;

FIGS. 5 and 6 are longitudinal sectional views respectively illustrating high-strength, friction-type, external-coupling rod joints of the invention;

FIG. 7 is a longitudinal sectional view illustrating a high-strength, friction-type, bell-and-spigot-type tubing joint of the invention; and FIG. 8 is a fragmentary longitudinal sectional view illustrating a high-strength, friction-type, external-coupling tubing joint of the invention having interengageable tapered surfaces which are provided with shallow threads for make-up purposes.

Before describing the manner in which stress concentrations are minimized in the various high-strength, friction-type joints of FIGS. 1 to 8, various factors entering into the structure of the joint of FIG. 1 will be described, with the understanding that such description is also applicable to the joints of FIGS. 2 to 8, except as otherwise noted. Subsequently, the manner in which stress concentrations are minimized in the joint of FIG. 1 will be described. Thereafter, the structures of the joints of FIGS. 2 to 8 will be described briefly, and the manners in which stress concentrations therein are minimized will be disclosed.

TUBING JOINT CONSTRUCTION 20

Referring to FIG. 1 of the drawings, illustrated therein is a coupling-type tubing joint construction 20 of the invention comprising an external coupling 22 the respective end portions or ends 24 and 26 of which receive therein, in closely spaced relation, adjacent end portions or ends 28 and 30 of tubings 32 and 34 forming a tubing string 36. The coupling and tubing ends 24 and 28 form a tubing joint 38 and the coupling and tubing ends 26 and 30 form a tubing joint 40. The two tubing joints 38 and 40 are identical so that only the former will be considered.

The inner member of the tubing joint 38, i.e., the tubing end 28, is provided with a tapered outer surface 42 which converges axially inwardly relative to the coupling 22. The outer member of the tubing joint 38, i.e., the coupling end 24, is provided with a complementarily tapered inner surface 44. The two tapered surfaces 42 and 44 are pressurally interengaged along the interface therebetween with a high engagement pressure induced by a high hoop tension stress in the coupling end 24 and an opposing high hoop compression stress in the tubing end 28. As will be discussed in detail hereinafter, the axial length of the tapered surfaces 42 and 44 in pressural interengagement with each other is so related to the high engagement pressure between the tapered surfaces and the effective coefficient of friction therebetween as to produce a frictional resistance to relative bodily displacement of the tapered surfaces, either axially or circumferentially, sufficiently high to develop a joint strength at least nearly equal to the yield strength of the tubing 32. As will be discussed, the strength of the joint 38 may also attain or exceed the ultimate strength of the tubing 32.

The foregoing high frictional resistance to relative bodily displacement of the tapered surfaces 42 and 44 is preferably achieved by shrinking the coupling end 24 onto the tubing end 28, and particularly by hydraulically shrinking the coupling end onto the tubing end. Considering how this may be accomplished, the coupling end 24 is provided at approximatly the axial midpoint of its tapered surface 44 with a port 46 for injecting a fluid, such as oil, under high pressure into the axially central region of the annular interface between the tapered surfaces 42 and 44. The port 46 communicates at its inner end with an internal annular groove 48 in the coupling end 24 at about the axial midpoint of the tapered surface 44, and is provided at its outer end with a radially-inwardly-convergent annular seat 47 for a suitable fluid injection nozzle.

In making up the tubing joint 38, the tubing end 28 is inserted in the coupling end 24 until the tapered surface 42 engages the tapered surface 44 in the central region of the interface therebetween and in annular sealing regions on axially opposite sides of the port 46. Oil, or other fluid, under high pressure, which pressure may be as high as 30,000 p.s.i., or more, is then injected into the annular central region of the interface between the two tapered surfaces, at the same time applying an axial make up force to the coupling 22 and the tubing 32 tending to further insert the tubing end 28 into the coupling end 24. The high fluid pressure within the central region of the interface expands the adjacent portion of the coupling end 24 outwardly and contracts the adjacent portion of the tubing end 28 inwardly, without however, breaking contact in the annular sealing regions on axially opposite sides of the central region so long as a sufficiently high axial make up force is applied. This make up force must be high enough to resist the action of the injection pressure on the axially projected areas of the tapered surfaces 42 and 44. Thus, the injected fluid is trapped in the annular central region of the interface.

As the pressure of the trapped fluid builds up, the coupling and tubing ends 24 and 28 are caused to be moved axially toward each other by the axial make up force to increase the extent to which the tubing end is inserted into the coupling end. After the maximum injection pressure and the maximum axial make up force for which the tubing joint 38 is designed have been reached, the tubing end 28 is in effect "bottomed" within the coupling end 24. (Such "bottoming" is solely the result of interengagement of the tapered surfaces 42 and 44, there being no annular shoulders, or the like, to artificially limit insertion.) Then, the application of the injection pressure is discontinued and the excess injected fluid is permitted to escape through the port 46. This permits the outwardly expanded portion of the coupling end 24 to contract inwardly, and simultaneously permits the inwardly contracted portion of the tubing end 28 to expand outwardly. The result is that the coupling end 24 is shrunk onto the tubing end 28 with a high engagement pressure determined by the maximum injection pressure and the maximum axial make up force.

It will be apparent that, in order to break the tubing joint 38, a similar procedure is followed. The injection pressure acting on the axially projected areas of the tapered surfaces 42 and 44 is normally sufficient to produce axial separation of the coupling and tubing ends 24 and 28. Actually, it may be necessary to restrain such axial separation.

When making up and breaking the tubing joint 38, the major portions of the tapered surfaces 42 and 44 intermediate the ends thereof are physically separated by the injected fluid, the latter being trapped in the central region of the interface with contact pressures between the tapered surfaces at the ends of the interface which are not excessively high. Consequently, galling of the tapered surfaces 42 and 44 in response to relative axial movement thereof in making up and breaking the joint 38 does not occur despite very high engagement pressures between the tapered surfaces when the joint is made up. Therefore, the joint 38 may be made up and broken repeatedly.

An annular seal 49, shown as located in an external annular groove in the tubing end 28 adjacent its innermost extremity, may be disposed between the tapered surfaces 42 and 44 adjacent the inner end of the interface therebetween. This seal prevents any inernal pressure which may be developed in the tubing string 36 in use from being applied to the interface between the tapered surfaces 42 and 44 to tend to break the tubing joint 38. Any internal fluid which may leak past the annular seal 49 into the interface between the tapered surfaces 42 and 44 escapes by way of the annular groove 48 and the port 46. Consequently, no joint-loosening pressure can build up in the interface, being constantly bled off.

It will also be noted from the foregoing that any internal pressure which may exist in the tubing string 36 in use merely tends to tighten the tubing joint 38 since it acts outwardly on the tubing end 28 to tend to expand it into more positive engagement with the coupling end 24. To prevent the internal pressure from having any significant expanding effect on the coupling 22 itself, the axial separation between the innermost extremities of the two tubing ends 28 and 30 is kept as small as practicable to minimize the coupling area on which the internal pressure can act.

With the foregoing as general background, various important considerations which enter into the structure of the tubing joint 38, and into the materials used for the coupling 22 and the tubing 32, will now be discussed. It should be kept in mind that, with exceptions which will be pointed out, these considerations are also applicable to the tubing and rod joint species of the invention which will be described hereinafter.

In general, the axial length of the tapered surfaces 42 and 44 in pressural interengagement with each other, the engagement pressure between the tapered surfaces resulting from the hoop tension and compression stresses in the coupling and tubing ends 24 and 28, and the effective coefficient of friction between the surfaces, are so related as to produce a frictional resistance to relative bodily displacement of the tapered surfaces sufficiently high to develop a high-strength friction-type tubing joint 38, the joint strength being at least nearly equal to the nominal yield strength of the tubing 32 and, under some conditions, at least nearly equal to, or even exceeding, the ultimate strength of the tubing.

More particularly, the joint strength may be increased by increasing the axial length of pressural interengagement between the tapered surfaces 42 and 44, the effective coefficient of static friction therebetween, or the engagement pressure therebetween. To avoid an excessively long tubing joint 38, the axial length of the tapered surfaces 42 and 44 is preferably kept as small as possible, which means that it is necessary to make the engagement pressure and the effective coefficient of friction as high as possible, at the same time keeping the included angle of the tapered surfaces relatively small.

Considering the matter of the axial length of the interface between the tapered surfaces 42 and 44 in more detail, this length must be at least about 0.5 times the outside diameter of the body of the tubing 32 to obtain the desired high joint strength. However, the maximum axial length of the interface may be as much as about 6.0 times the outside diameter of the tubing 32 without being excessive for some applications, but is preferably not more than about 3.0 times the outside diameter of the tubing to be commercially practicable for all applications. (These ranges of ratios of the axial interface length to the outside diameter of the elongated element of the joint are also applicable to the other tubing and rod joint species hereinafter disclosed.)

The axial length of the tapered surfaces 42 and 44 in pressural interengagement in the made up tubing joint 38 may be minimized in various ways. One way is to utilize hoop tension and compression stresses in the coupling and tubing ends 24 and 28 which are as high as possible, thereby achieving as high an engagement pressure between the tapered surfaces as possible. Preferably, in the absence of applied loads, the loop stresses are close to but slightly less than the respective yield points of the materials of which the coupling and tubing ends 24 and 28 are made. With stresses close to the yield points, the interface length to elongated-element outside diameter ratio discussed above may be held within the preferred range of 0.5 to 3.0. (Various factors involved in selecting materials for the coupling 22 and the tubing 32 will be considered hereinafter, as will various factors entering into the selection of radial dimensions for the coupling and tubing ends 24 and 28.)

The other principal factor determining the length of the interface between the tapered surfaces 42 and 44 is, as hereinbefore indicated, the effective coefficient of friction, which is preferably made as large as possible. With the materials normally used for tubings and coupling in the oil industry, and with the surface roughnesses normally encountered, the effective coefficient of friction is in the neighborhood of 0.20. However, in some instances, a value as low as about 0.1 may be used without departing from the interface length to elongated-element outside diameter ratio ranges given above. Also, much higher effective coefficients of friction much higher than this, up to as high as the order of 0.80, can be achieved. For example, either or both of the tapered surfaces 42 and 44 may be roughened artificially, as by knurling, etching, sand blasting, plating in such a way as to roughen, and the like. As another example, various keying agents capable of embedding themselves in the tapered surfaces 42 and 44 may be inserted therebetween.

The included angle of the tapered surfaces 42 and 44 enters into the axial length of engagement of the surfaces, but only to the extent of reducing the influence of the effective coefficient of friction by the tangent of one half its value. Theoretically, the included taper angle could be 0°, but, as a practical matter, to facilitate insertion of the tubing end 28 into the coupling end 24, and to limit the variation in depth of insertion of the tubing end into the coupling with practical diameters and angle tolerances the included angle taper should be not less than about 0°30′. The maximum included taper angle should not be more than about 4° where, as shown in FIG. 1 of the drawings, the wall thicknesses of the coupling and tubing ends 24 and 28 vary in the axial direction as the result of forming the tapered surfaces 42 and 44 by machining. It will be noted that the wall thickness of the tubing end 28 decreases in the direction of taper of the tapered surface 42, while the wall thickness of the coupling end 24 increases in the direction of taper of the tapered surface 44. This reduction in wall thickness should be limited to about 20%. Higher taper angles, e.g., up to about 18°, may be used if the wall thicknesses of the coupling and tubing ends 24 and 28 are constant.

The foregoing effective coefficient of friction and included taper angle ranges are also applicable to the tubing and rod joint species hereinafter disclosed.

Turning now to a discussion of still other important considerations involved in the tubing joint 38, it will be recalled that the high hoop tension and compression stresses in the coupling and tubing ends 24 and 28 respectively establish axial compression and tension stresses in the coupling and tubing ends which, according to Poisson's ratio, are, for steel, approximately equal to 0.3 times the respective hoop tension and compression stresses. Consequently, an axial tension load applied to the tubing 32 tends to decrease the initial axial compression stress in the coupling end 24 and to increase the initial axial tension stress in the tubing end 28, the compression stress in the coupling end 24 reversing and becoming a net axial tension stress upon application of a sufficiently high axial tension load. Because of this effect, the wall thickness of the coupling end 24 can be reduced, and can be further reduced by utilizing for the coupling 22 a material having a higher yield strength than the material of the tubing end 28. Thus, the coupling 22 can be considerably thinner than the tubing 32, as shown in FIG. 1 of the drawings. This is important because it reduces the over-all diameter of the tubing joint 38, which is of significance in locations, such as oil wells, where space is at a premium.

One effect of such a relatively thin coupling 22 is that, when an axial tension load is applied to the tubing 32, the coupling end 24, on the average, contracts more than the tubing end 28. Therefore, under these conditions, the engagement pressure between the tapered surfaces 42 and 44 actually increases with an increase in the tension load, as long as the stresses in the coupling and tubing ends are below the yield stresses. This is important because it increases the strength of the tubing joint 38.

As the axial tension stress in the tubing end 28 exceeds the tensile yield stress, with the stress in the coupling still within the elastic limit, the tubing end will contract faster than the coupling end 24, with the result that the engagement pressure between the tapered surfaces 42 and 44 will be reduced, and with the ultimate result that the tubing joint 38 will fail by pulling the tubing end out of the coupling end. This effect is heightened by the initial axial tension stress in the tubing end 28 induced by the shrink fit between the coupling and tubing ends. As the axial tension load on the tubing 32 is progressively increased, the axial tension stress in the tubing 32 first exceeds the yield strength in tension near or within the interface between the tapered surfaces 42 and 44. The result is that the tubing joint 38 fails by necking down of the tubing end 28, starting near the outer extremity of the coupling end 24, and progressing axially into the interior of the coupling end.

To offset the foregoing effect and thus obtain a tubing joint 38 having a higher strength in tension, several alternatives are possible. First, the elastic limit of the tubing end 28 may be increased by cold working. Second, the tubing end 28 might be provided with a greater wall thickness than the nominal wall thickness of the tubing 32. Third, both the elastic limit and the wall thickness of the tubing end 28 can be increased by cold working. By cold working the tubing end 28 to increase its elastic limit only, a joint strength at least equal to the yield strength of the tubing 32 can be attained. By cold working the tubing end 28 to increase its elastic limit and by cold upsetting it to increase its wall thickness, the strength of the tubing joint 38 can be made to exceed the ultimate strength of the tubing 32, whereupon failure occurs in the body of the tubing outside the joint 38. This effect may be achieved with a thickness increase of the order of 10% to 15%, which adds only a few hundredths of an inch to the outer diameter of the tubing end 28.

Throughout all of the foregoing discussion of the tubing joint 38, it has been assumed that the moduli of elesticity of the materials of the coupling and tubing ends 24 and 28 are substantially equal. This assumption holds for coupling and tubing ends of steel even if the two members are made of steels having quite-different physical properties. With the steels normally used for oil well tubings and couplings, the variation in modulus of elasticity will not be more than a few percent, which has only a negligible effect on the strength of the tubing joint 38. However, a significant effect can be achieved by utilizing for the coupling 22 a material having a relatively low modulus of elasticity, but as high a strength as possible, and by using for the tubing 32 a material having a relatively high modulus of elasticity. For example, high strength aluminum alloys might be used for the coupling 22 and steel for the tubing 32. With such materials, the coupling end 24 would contract more than twice as much as the tubing end 28 for a given axial tension load, thereby producing a very substantial increase in the contact pressure between the tapered surfaces 42 and 44 as the axial tension load is increased. With such a construction, a joint strength at least as high as the ultimate tubing strength can readily be achieved. However, it would be necessary to utilize a relatively thick walled coupling 22 because of the present impossibility of obtaining materials having a modulus of elasticity which is low as compared to that of steel, but having a strength which is as high as that of steel. Nevertheless, where the wall thickness of the coupling 22 is not a factor, such a construction is entirely practical.

If the engagement pressure between the coupling portion 24 and the tubing end 28 were substantially uniform throughout the length of the interface between the tapered surfaces 42 and 44, a stress concentration would be produced in the tubing 32 at the extreme end of the coupling portion 24. To minimize any such stress concentration, the coupling portion 24 is provided with means for progressively reducing the engagement pressure between the tapered surfaces 42 and 44 in an end region of the interface therebetween, i.e., adjacent the end of the coupling portion 24. More particularly, any stress concentration in the tubing 32 at the end of the coupling portion 24 is minimized or eliminated by relieving an end region 50 of the coupling portion 24 adjacent the corresponding end of the interface between the tapered surfaces 42 and 44.

In the embodiment under consideration, the relieved end region 50 of the coupling portion 24 comprises an axially tapered inner surface 52 having a slightly higher taper angle than the tapered inner surface 44 of the coupling portion 24. For example, the included taper angle of the tapered inner surface 52 may be about 30' higher than the included taper angle of the tapered inner surface 44, the difference between the two taper angles being greatly exaggerated in FIG. 1 of the drawings. The axial extent of the tapered inner surface 52 may range up to about 25% of the axial length of engagement between the internal groove 48 and the end of the coupling portion 24.

With the foregoing construction, the engagement pressure between the coupling portion 24 and the tubing end 28 progressively decreases axially of the relieved end region 50, in a direction toward the end of the coupling portion 24. The resulting tapering off of the engagement pressure toward the extremity of the coupling portion 24 minimizes, or completely eliminates, any stress concentration in the tubing 32 at the end of the coupling portion. Thus, any tendency of the tubing 32 to fail at the end of the coupling portion 24, due to a stress concentration resulting from the pressural-interengagement between the tubing and coupling, is eliminated, which is an important feature of the invention.

TUBING JOINT CONSTRUCTION 20a

Turning now to FIG. 2 of the drawings, illustrated therein is a coupling-type tubing joint construction 20a of the invention which is substantially identical to the tubing joint construction 20. Consequently, only the differences between the two will be described. For convenience, the various elements of the tubing joint construction 20a are identified by adding the suffix a to the reference numerals utilized for the corresponding elements of the tubing joint construction 20.

In the embodiment of FIG. 2, the coupling portion 24a includes a relieved end region 50a which comprises providing the coupling portion with an axially tapered outer surface 52a converging toward the end of the coupling portion. With this construction, the thickness of the coupling portion 24a is progressively reduced throughout the relieved end region 50a. This progressive reduction in the thickness of the coupling portion 24a correspondingly progressively reduces the engagement pressure between the coupling portion 24a and the tubing end 28a, the reason being that the hoop tension force in the coupling portion 24a progressively decreases throughout the end region 50a. Consequently, the effect is to minimize any stress concentration in the tubing 32a at the end of the coupling portion 24a, which is an important feature.

The axial extent of the tapered outer surface 52a may range up to about 25% of the axial length of the pressural interengagement between the coupling portion 24a and the tubing end 28a measured from the internal groove 48a and the end of the coupling 24a. To achieve the desired stress concentration relief, the taper angle of the tapered outer surface 52a is such as to reduce the thickness of the coupling portion 24a at the outer end of the end region 50a to about 50% of the thickness thereof at the inner end of the end region 50a.

TUBING JOINT CONSTRUCTION 120

Referring to FIG. 3 of the drawings, illustrated therein is a tubing joint construction 120 which is generally similar to the tubing joint construction 20, the various components of the tubing joint construction 120 being identified by reference numerals higher by one hundred than those used in connection with the corresponding components of the tubing joint construction 20.

Considering only the differences between the tubing joint 138 and the tubing joint 38, the coupling end or portion 124 is inserted into the tubing end 128 and the fluid injection port 146 is formed in the tubing end. The annular seal 149 for minimizing leakage into the interface between the tapered surfaces 142 and 144 is carried by the coupling portion 124 adjacent its end. To permit providing the coupling 122 with an inner diameter equal to the inner diameter of the tubing 132, the tubing end 128 is expanded or belled. This is preferably done by cold working to increase the elastic limit of the tubing material forming the tubing end 128.

In general, the discussion presented previously in connection with the tubing joint 38 applies to the tubing joint 138. In other words, the previously presented ranges of ratios of axial interface length to elongated-element outside diameter, ranges of effective coefficients of friction, and ranges of included taper angles, all apply, as do the described ways of increasing the effective coefficient of friction.

While most of the important considerations applicable to the tubing joint 38 are also applicable to the tubing joint 138, the internal coupling version does behave differently in a respect which is highly advantageous. More specifically, with the internal coupling 122, the tubing end 128 has an initial axial compression stress, due to the hoop tension stress therein, which reduces the net axial tension stress when the tubing 132 is subjected to an axial tension load. Therefore, without upsetting or severe cold working of the tubing end 128, the strength of the tubing joint 138 can easily be made to exceed the ultimate strength of the tubing 132. Consider, for example, a tubing 132 having a yield strength in tension of 40,000 p.s.i. The initial hoop tension stress in the tubing end 128, resulting from the high engagement pressure of the shrink fit, is at least nearly equal to the yield strength of the material. This gives an axial compression in the tubing end 128 of 0.3 times the yield, which subtracts from the tensile stress in the tubing end, making the stress therein at the end of the internal coupling portion 124 only about 28,000 p.s.i. when the tubing 132 itself is stressed to 40,000 p.s.i. when this yield point is exceeded the tubing will begin to neck down, but the point where failure starts will always be spaced from the coupling 122 because of the reduced tensile stress in the tubing end. The tensile load in the tubing 132 increases the gripping action of the tubing onto the coupling at the end of the coupling portion 124. The magnitude of this increase is directly proportional to the tensile load up to the elastic limit of the material. When the stress is raised above the elastic limit in the tubing end, the contraction and gripping action is more than directly proportional to the increased tensile load. Tubing having a yield strength of 40,000 p.s.i. will have an ultimate strength of approximately 60,000 p.s.i. But since the net tensile stress in the tubing end is only 70% (1–0.3) of that at a point remote from the coupling even at the ultimate at that point, the stress in the tubing end is only slightly above the yield point. With higher strength steels the yields point and ultimate Turing to FIG. 4, illustrated therein is a tubing joint the gripping action always increases with load even when the tubing is stressed beyond the yield point and the axial stress in the tubing end is always less than in the body of the tubing. Consequently, with the internal coupling 122, failure occurs in the tubing 132 proper at a point spaced from the coupling, and never in the tubing joint 138 itself. The foregoing effect is amplified by the cold working necessary to expand or bell the tubing end 128 to receive the corresponding coupling end 124. Thus, with the tubing joint 138, a joint strength in excess of the ultimate strength of the tubings can easily be attained, which is an important advantage of the internal coupling species of the invention.

As in the case of the external coupling 22, the internal coupling 122 is preferably made of higher strength material and thinner than the tubing ends 128 and 130, thereby saving space, which is particularly important in an oil well. Further space savings can be achieved by utilizing for the internal coupling 122 a material having a modulus of elasticity much higher than the modulus of elasticity of the tubings 132 and 134. For example, the tubings can be made of steel and the internal coupling 122 of tungsten, which has a modulus of elasticity approximately two-thirds greater than that of steel. Consequently, the tubing ends will contract more than the internal coupling for the same tensile stress, thereby causing the tubing ends to grip the coupling more and more tightly as the stress is increased within the elastic limit. The same effect can also be obtained by using tubing of aluminum alloy with internal couplings of steel. Consequently, a joint strength in excess of the ultimate strength of the tubings can easily be achieved with an extremely thin internal coupling.

To minimize or eliminate any stress concentration in the tubing 132 at the end of the coupling portion 124, the latter is provided with a relieved end region 150 similar to the relieved end region 50 of the coupling portion 24. More particularly, the relieved end region 150 comprises an external tapered surface 152 on the coupling portion 124 having an included taper angle exceeding that of the tapered surfaces 142 and 144. The taper angle difference, which is greatly exaggerated in FIG. 3, and the axial extent of the tapered surface 152, are, similar to those hereinbefore discussed in connection with the tubing joint construction 20.

TUBING JOINT CONSTRUCTION 120a

Turning to FIG. 4, illustrated therein is a tubing joint construction 120a which is substantially identical to the tubing joint construction 120, reference characters differing only by the addition of the suffix a being utilized for corresponding elements of the tubing joint construction 120a. Only the differences between the tubing joint constructions 120 and 120a will be considered.

In the tubing joint construction 120a, any stress concentration in the tubing 132a at the end of the coupling portion 124a is minimized, or eliminated, by providing the coupling portion 124a with a relieved end portion 150a. The latter involves providing the coupling portion 124a with an axially tapered inner surface 152a diverging toward the end of the coupling portion 124a. This has the effect of progressively reducing the thickness of the coupling portion 124a toward the end thereof in the same manner as the coupling portion 24a, thereby minimizing or eliminating any stress concentration in the same manner so that a further description is not necessary.

ROD JOINT CONSTRUCTION 220

Illustrated in FIG. 5 of the drawings is a rod joint construction 220 of the invention which is generally similar to the tubing joint construction 20, except that the elongated elements frictionally interconnected in end-to-end relation are solid rods, rather than tubings. In view of the similarily between the tubing joint construction 20 and the rod joint construction 220, the components of the latter are identified by reference numerals higher by two hundred than those used in conjunction with the corresponding components of the tubing joint construction 20. Thus, the rod joint construction 220 includes a rod joint 238 comprising an end portion 224 of a coupling 222 receiving therein an end 228, preferably cold upset, of a solid rod 232. The rod end 228 has an axially tapered surface 242 pressurally interengaged with an axially tapered internal surface 244 of the coupling portion 224. The rod joint 238 may be made up and broken by injecting a fluid under high pressure into the axially central region of the interface between the tapered surfaces 242 and 244 through a port 246 formed in the coupling end 224 and communicating at its inner end with an internal annular distributing groove 248 in the coupling portion 224. A radially-inwardly-converging ananular seat 247 is provided at the outer end of the fluid injection port 246 to receive an injection nozzle, not shown. As in the case of the tubing joint construction 20, the two rod ends 228 and 230 are closely spaced within the coupling 222. The coupling 222 is provided therein with a bleed port 245 to drain from the space between the rod ends any injected fluid leaking thereinto so as to prevent a pressure build-up from interfering with making up of the joint 238, or its strength.

In general, the various important considerations hereinbefore discussed in connection with the external-coupling type tubing joint joint construction 20 are applicable to the rod joint construction 220. In other words, the same ranges of ratios of axial interface lengths to elongated-element outside diameters, the same ranges of effective coefficients of friction, and the same ranges of included taper angles, are applicable. Additionally, similar material and material-characteristic relationships may be used in the rod joint construction 220. Also, the effective coefficient of friction between the tapered surfaces 242 and 244 may be suitably increased.

Any stress concentration in the rod 232 at the end of the coupling portion 224 is minimized or eliminated by providing the coupling portion 224 with a relieved end region 250 having a tapered external surface 252 which progressively decreases the thickness of the coupling portion 224 axially of the end region 250 and toward the end of the coupling portion. This construction progressively reduces the engagement pressure between the rod end 228 and the coupling portion 224 in the manner hereinbefore discussed in connection with the tubing joint construction 20a.

ROD JOINT CONSTRUCTION 220a

FIG. 6 of the drawings illustrates a rod joint construction 220a which is substantially identical to the rod joint construction 220, corresponding elements being identified by reference characters differing in the addition of the suffix a.

The coupling portion 224a is provided with a relieved end region 250a having an axially tapered internal surface 252a provided with a slightly greater taper angle than the tapered surfaces 242a and 244a. With this construction, any stress concentration in the rod 232a at the end of the coupling portion 224a is minimized or eliminated in the same manner as in the tubing joint construction 20. Consequently, no further description is necessary.

BELL-AND-SPIGOT JOINT CONSTRUCTION 160

Instead of frictionally interconnecting two tubings in end-to-end relation by means of a tubing joint construction which includes a coupling, they may be frictionally interconnected directly, without a coupling, by means of a bell-and-spigot-type of tubing joint 160, as shown in FIG. 7 of the drawings. The tubing joint 160 includes a tubing end 162, of a tubing 166, frictionally held in a tubing end 164, of a tubing 168, the two tubings forming a tubing string 170. The tubing ends 162 and 164 respectively have frictionally interengaged tapered surfaces 172 and 174. Fluid leakage into the interface between the tapered surfaces 172 and 174 is prevented by an annular seal 176 carried by the tubing end 162 adjacent its extremity. The outer tubing end 164 is provided with an injection port 178 communicating with an internal annular groove 180 therein to permit injection of fluid under high pressure in making up or breaking the tubing joint 160. The tubing end 164 is expanded or belled to receive the tubing end 162, the latter also preferably being expanded sufficiently to make its smallest inner diameter at least equal to the inner diameters of the tubings 166 and 168 to minimize any restriction to fluid flow through the tubing joint 160. In the tubing joint 160, the wall thicknesses of the tubing ends 162 and 164 are shown as constant.

The various important considerations hereinbefore discussed in connection with the coupling-type tubing joint 38 are applicable to the tubing joint 160, except for those involving the use of different materials, or materials with different physical properties, for the inner and outer members. In the tubing joint 160, the inner and outer members, being integral with the tubings, must be formed of the same materials and materials having substantially the same physical properties, although certain physical properties can be varied by differentially cold working the inner and outer members.

In the tubing joint 160, the tubing ends 162 and 164 have relieved end regions 182 comprising tapered surfaces 184 which progressively reduce the thicknesses of the tubing ends toward the extremities thereof. With this construciton, stress concentrations in the tubings 166 and 168 at the extremities of the tubing ends 162 and 164 are minimized, or eliminated, in essentially the same manner as hereinbefore discussed in connection with FIG. 2. of the drawings. If desired, stress concentrations in the tubings 166 and 168 may also be minimized or eliminated in the manner in which this is accomplished in the tubing joint construction 20 of FIG. 1 of the drawings.

THREADING TUBING JOINT CONSTRUCTION 20c

The joint of the invention has previously been described as capable of being made up by application of an axial make up force without relative rotation of the inner and outer members. Shown in FIG. 8 is an alternative tubing joint construction 20c wherein the axial make up force is produced, in response to relative rotation of the tubing and coupling ends 28c and 24c of a tubing joint 38c, by mating wide, shallow, tapered threads 72c and 74c on the tubing and coupling ends, respectively. The threads 72c and 74c are formed exclusively in axially-central regions of tapered surfaces 42c and 44c and have flat root and crest surfaces which constitute the tapered surfaces 42c and 44c. In other words, in the central region of the interface between the tapered surfaces 42c and 44c, the interface is formed by the root and crest surfaces of the thread 72c and the mating root and crest surfaces of the thread 74c. The threads 72c and 74c do not extend into the fluid-sealing regions at the ends of the tapered surfaces 42c and 44c, but extend only throughout central regions thereof. The threads 72c and 74c are complementarily tapered from zero depth at one of the fluid sealing regions to a maximum depth less than one-half the thread width at the other of the fluid sealing regions. While the threads 72c and 74c do provide some mechanical strength, the strength of the threaded joint of the invention is primarily due to friction between the tapered surfaces 42c and 44c as in the unthreaded species of the invention. The threads 72c and 74c function primarily to cause relative axial movement of the tubing and coupling ends 28c and 24c upon relative rotation thereof while fluid under high pressure is present in the central region of the interface during make up or breaking of the joint, such fluid being retained in the central region by the fluid sealing regions at the ends of the interface. Preferably, the threads 72c and 74c provide flank clearances to facilitate distribution of the injected fluid throughout the central region of the interface.

With the foregoing in mind, it will be apparent that the threads 72c and 74c may be quite shallow. For example, maximum depths ranging from 0.010 inch to 0.030 inch are adequate in small-diameter tubings (or rods), although they may be deeper for larger sizes. Preferably, the threads are modified square threads, actually trapezoidal threads, the flanks of which include angles of the order of 10°. This threaded arrangement for making up and breaking the tubing joint 38c may be applied to any of the other joints hereinbefore described.

The coupling portion 24c is provided with a relieved end region 50c comprising an axially tapered external surface 52c converging toward the end of the coupling portion 24c to progressively reduce the thickness thereof. This reduces or eliminates stress concentrations in the tubing 32c in the same manner as hereinbefore described in connection with the tubing joint construction 20a of FIG. 2. Alternatively, the stress-concentration-relief approach of FIG. 1 may be used.

CONCLUSION

In the embodiments of FIGS. 1 to 6 and 8, stress concentrations in the tubings or rods are minimized by relieving end regions of the couplings. However, the tubings or rods themselves may be relieved to achieve the same result. For example, in FIG. 1, the portion of the tubing 32 within the end region 50 of the coupling portion 24 may be relieved by having its taper angle slightly less than the taper angle of the surface 42. This achieves the same effect as making the taper angle of the tapered surface 52 slightly greater than the taper angle of the tapered surface 42. Similar considerations are applicable to the embodiments of FIGS. 2 to 6 and 8.

If desired, stress concentrations in the couplings of the embodiments of FIGS. 1 to 6 and 8 may be minimized by relieving end regions of the corresponding tubing and rod ends, in much the same manner as end regions of the couplings are relieved. However, it is usually not necessary to minimize stress concentrations in the couplings since the couplings, being relatively small components, can economically be made of materials capable of withstanding any stress concentrations developed therein.

Although various exemplary embodiments have been disclosed herein for purposes of illustration, it will be understood that various changes, modifications and substitutions, such as those hereinbefore suggested, may be incorporated in such embodiments without departing from the spirit of the invention.

What is claimed is:
1. A high-strength, friction-type joint for connecting an elongated element, such as a tubing or rod, to another element, including:
 (a) an outer tubular member;
 (b) an inner member;
 (c) one of said members being an end portion of said elongated element and the other of said members being an end portion of said other element;
 (d) an inner, axially tapered surface within said outer member;
 (e) a complementary outer, axially tapered surface on said inner member;
 (f) said tapered surfaces being pressurally interengaged along an interface therebetween with a high engagement pressure induced by a high hoop tension stress in said outer member and an opposing high compression stress in said inner member;
 (g) said high hoop tension stress and said opposing high compression stress respectively being close to but slightly less than the yield points of the materials of said outer and inner members;
 (h) the axial length of said tapered surfaces in pressural interengagement with each other being so related to the engagement pressure between said tapered surfaces and the effective coefficient of friction therebetween as to produce a high frictional resistance to relative bodily displacement of said tapered surfaces at least nearly equal to the nominal yield strength of said elongated element;
 (i) an annular region of one of said members adjacent one end of said interface being progressively relieved in a direction which extends axially toward said end of said interface so as to progressively reduce the engagement pressure between said tapered surfaces in said direction to minimize any stress concentration in the other of said members adjacent said end of said interface; and
 (j) said progressively-relieved annular region comprising an axial extension of one of said tapered surfaces having a taper angle differing from that of said one tapered surface by an angle of the order of one-half degree.

2. A high-strength, friction-type joint as set forth in claim 1 wherein said progressively-relieved annular region is on said outer member.

3. A high-strength, friction-type joint as set forth in claim 1 wherein said progressively-relieved annular region is on said inner member.

4. A high-strength, friction-type joint for connecting an elongated element, such as a tubing or rod, to another element, including:
 (a) an outer tubular member;
 (b) an inner member;
 (c) one of said members being an end portion of said elongated element and the other of said members being an end portion of said other element;
 (d) an inner, axially tapered surface within said outer member;
 (e) a complementary outer, axially tapered surface on said inner member;
 (f) said tapered surfaces being pressurally interengaged along an interface therebetween with a high engagement pressure induced by a high hoop tension stress in said outer member and an opposing high compression stress in said inner member;
 (g) said high hoop tension stress and said opposing high compression stress respectively being close to but slightly less than the yield points of the materials of said outer and inner members;
 (h) the axial length of said tapered surfaces in pressural interengagement with each other being so related to the engagement pressure between said tapered surfaces and the effective coefficient of friction therebetween as to produce a high frictional resistance to relative bodily displacement of said tapered surfaces at least nearly equal to the nominal yield strength of said elongated element;
 (i) an annular region of one of said members adjacent one end of said interface being progressively relieved in a direction which extends axially toward said end of said interface so as to progressively reduce the engagement pressure between said tapered surfaces in said direction to minimize any stress concentration in the other of said members adjacent said end of said interface; and
 (j) said progressively-relieved annular region progressively decreasing in thickness in said direction and the thickness of the thinner end of said progressively-relieved annular region being about one-half the thickness of the thicker end thereof.

5. A high-strength, friction-type joint as set forth in claim 4 wherein said progressively-relieved annular region is on said outer member.

6. A high-strength, friction-type joint as set forth in claim 4 wherein said progressively-relieved annular region is on said inner member.

References Cited

UNITED STATES PATENTS

| | | | |
|---|---|---|---|
| 1,188,485 | 6/1916 | Pruyn | 285—334.2 X |
| 2,450,452 | 10/1948 | Scott | 285—115 |
| 2,564,670 | 8/1951 | Bratt. | |
| 2,671,949 | 3/1954 | Welton | 29—446 |
| 2,899,806 | 8/1959 | Fye. | |
| 2,926,940 | 3/1960 | Maass. | |
| 3,114,566 | 12/1963 | Coberly et al. | |
| 3,126,214 | 3/1964 | Wong et al. | 285—381 X |
| 3,287,034 | 11/1966 | Bragg | 285—115 |
| 2,992,479 | 7/1961 | Musser et al. | 29—421 |
| 3,142,901 | 8/1964 | Bodine | 29—525 |

FOREIGN PATENTS 19,113   1907   Great Britain.

THOMAS F. CALLAGHAN, Primary Examiner

U.S. Cl. X.R.

285—332.2, 381

PO-1050
(5/69)

UNITED STATES PATENT OFFICE
CERTIFICATE OF CORRECTION

Patent No. 3,494,640    Dated February 10, 1970

Inventor(s) Clarence J. Coberly and Francis Barton Brown

It is certified that error appears in the above-identified patent and that said Letters Patent are hereby corrected as shown below:

Column 2, line 5, "contract" should be --contact--;

Column 3, line 60, "stress" should be --stresses--;

Column 4, line 6, "material should be --materials--; and
line 50, "shinking" should be --shrinking--;

Column 5, line 67, "adjacenn" should be --adjacent--;

Column 8, line 21, "inernal" should be --internal--;

Column 9, line 19, "loop" should be --hoop--; and
line 34, "coupling" should be --couplings--;

Column 11, line 25, "copling" should be --coupling--; and

Column 13, line 21, "yields" should be --yield--; and
line 22, delete "Turning to Fig. 4, illustrated therein is a tubing joint" and insert in place thereof --are even closer together. Therefore with this form of joint--

SIGNED AND
SEALED

JUL 14 1970

(SEAL)
Attest:

Edward M. Fletcher, Jr.
Attesting Officer

WILLIAM E. SCHUYLER, JR.
Commissioner of Patents